United States Patent [19]
Perkins

[11] Patent Number: 5,211,118
[45] Date of Patent: May 18, 1993

[54] FIRE FIGHTING TOOL FOR EXTINGUISHING EMBERS AND FOR FIRE MOP UP

[76] Inventor: John G. Perkins, HC 70 Box 145, Bonner, Mont. 59823

[21] Appl. No.: 681,932

[22] Filed: Apr. 18, 1991

[51] Int. Cl.$^5$ .............................................. A01C 23/00
[52] U.S. Cl. ........................................ 111/7.1; 7/170; 7/114; 7/166; 169/7; 172/375
[58] Field of Search ................. 111/7.1, 127; 172/371, 172/375, 372; 169/54, 70, 91; 239/276, 280, 532; 7/158, 167, 170, 104, 114, 116, 143, 100, 166; 81/490-492; 403/355, 259-361

[56] References Cited

U.S. PATENT DOCUMENTS

| | | | |
|---|---|---|---|
| 896,512 | 8/1908 | Blauch | 7/143 |
| 1,103,484 | 7/1914 | Clarke | 111/7.1 |
| 1,408,584 | 3/1922 | Glasgow | 111/7.1 X |
| 1,562,982 | 11/1925 | Muend | 285/159 |
| 1,747,258 | 2/1930 | O'Neil | 111/7.1 |
| 1,756,582 | 4/1930 | Butler | 169/70 |
| 1,764,699 | 6/1930 | Simola et al. | 111/7.1 X |
| 2,730,387 | 1/1956 | White | 403/259 |
| 2,796,011 | 6/1957 | Schmidt | 172/375 |
| 2,804,767 | 9/1957 | Schoen | 111/7.1 X |
| 2,853,033 | 9/1958 | Hash | 111/7.1 |
| 3,143,984 | 8/1964 | Morasch | 111/7.1 |
| 3,326,306 | 6/1967 | Weir | 111/7.1 |
| 3,435,903 | 4/1969 | Sherrod, Jr. | 172/376 |
| 3,797,581 | 3/1974 | Holloway | 172/375 |
| 4,236,736 | 12/1980 | Anderson | 285/175 |
| 4,377,211 | 3/1983 | Voss | 172/375 |
| 4,730,679 | 3/1988 | Tallerico et al. | 172/375 |
| 4,730,680 | 3/1988 | Indzeoski | 172/375 |
| 4,802,535 | 2/1989 | Bakke | 169/70 |
| 4,890,679 | 1/1990 | Jacobs | 172/375 |
| 5,030,028 | 7/1991 | Rivera et al. | 403/259 |

FOREIGN PATENT DOCUMENTS

| 16469 | of 1920 | Australia | 111/7.1 |
| 18372 | 7/1934 | Australia | 172/375 |

*Primary Examiner*—Peter M. Cuomo
*Assistant Examiner*—Spencer Warnick

[57] ABSTRACT

A hand held fire fighting tool which attaches to a hose, having a handle through which water passes under pressure, having a connected head part which has a sharpened hoe, designed to pierce the ground surrounding burning roots, grass roots and debris when thrust forcefully thereagainst to thereby expose burning embers in fire mop up operations. Fire mop up consists of mixing burning embers with mineral soil, the layer of earth beneath combustible ground cover. The elimination of the mixture of burning embers and combustible material results in the extinguishing of a fire.

1 Claim, 1 Drawing Sheet

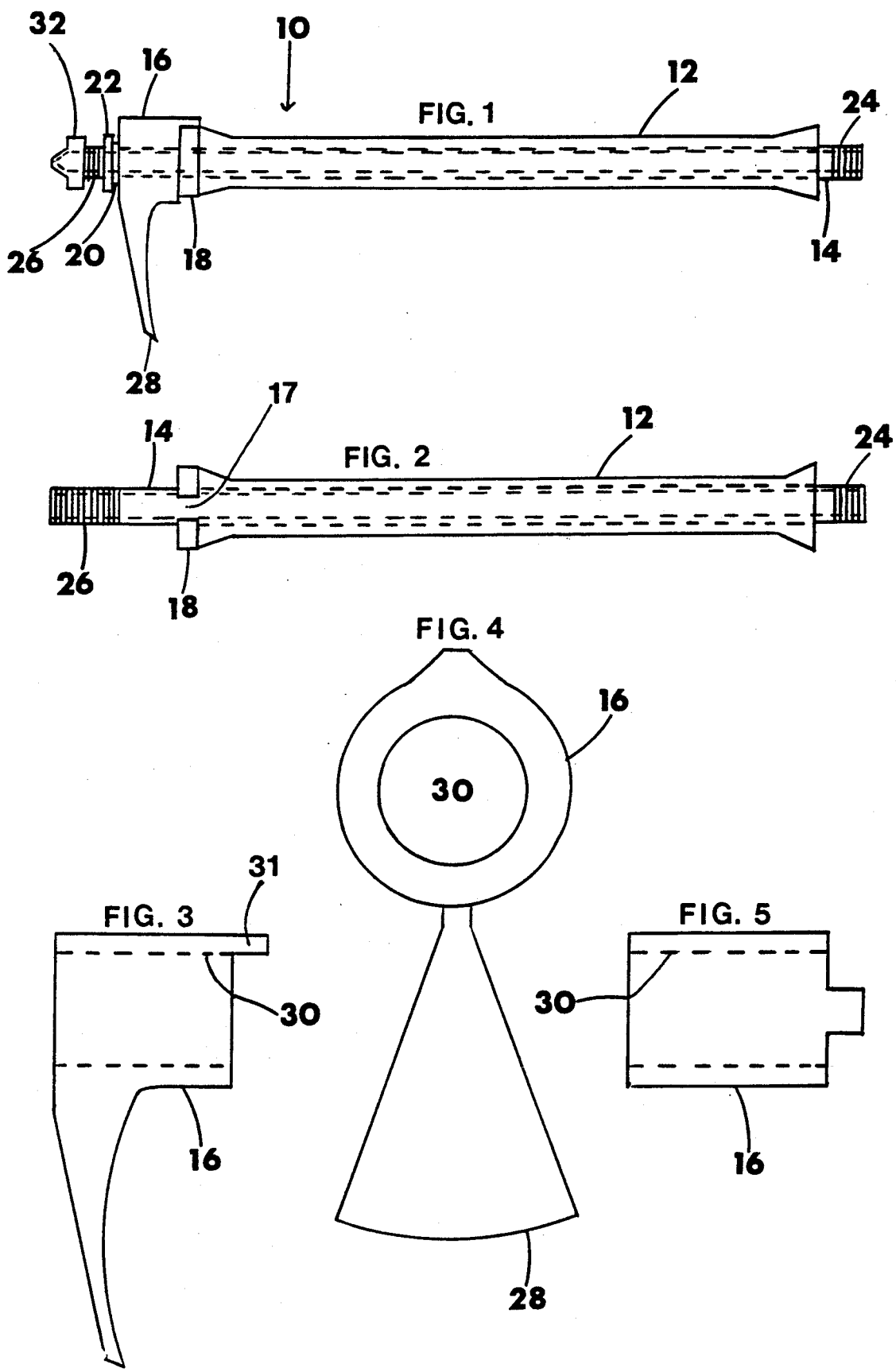

FIRE FIGHTING TOOL FOR EXTINGUISHING EMBERS AND FOR FIRE MOP UP

BACKGROUND OF INVENTION

Specialized tools for fighting fires but not designed to extinguish burning embers include U.S. Pat. Nos. 4,802,535 and 1,756,582 and tools for gardening and mixing include U.S. Pat. Nos. 3,326,306; 1,764,699; 1,408,584 and 2,796,011; and Australian Patent No. 16,469/28. But none of these, nor any other so far as known, provide for a tool with the functions of hoeing and mixing of burning embers with mineral soil and water in order to prevent the spread of fire. So it is the chief objective of the present invention to provide a novel and readily fabricated hoe which can perform a wide variety of fire fighting operations with the convenient use of pressurized water from many sources.

BRIEF SUMMARY OF THE INVENTION

This invention relates to a fire fighting hoe.

The fire fighting tool of this invention includes an elongated polyurethane handle which encloses a metal pipe through which water flows and a connected hoe head part. The head part includes a sharpened edge configured to allow hoeing of both undisturbed and cultivated soil. This fire fighting tool allows the fire fighter to perform two different tasks, hoeing and water spraying without changing tools.

Accordingly, it is an object of this invention to provide for a novel fire fighting tool.

Another object of this invention is to provide for a fire fighting tool which is durable, versatile and easy to use.

Other objects of this invention will become apparent upon a reading of the following description.

BRIEF DESCRIPTION OF DRAWINGS

FIG. 1 shows a perspective view of a one piece tool according to the invention.

FIG. 2 shows a top view of the polyurethane handle, the metal pipe running through the handle, and the collar slot for fitting and locking the hoe head on to the handle.

FIG. 3 shows a side view of the hoe head of the one piece tool with metal pipe running through the head.

FIG. 4 shows a front view of the hoe head of the one piece tool with a machined out area for the metal pipe to pass through.

FIG. 5 shows a top view of the hoe head with an extension that inserts into the handle's collar.

DRAWING REFERENCE NUMERALS 10 complete one piece tool according to invention
12 polyurethane handle
14 metal pipe running through one piece tool
16 hoe head of one piece tool
18 collar for receiving head
20 lock washer for receiving lock nut
22 lock nut for locking head to handle of one piece tool
24 metal pipe threads for hose connection
26 metal pipe threads for nozzle attachments
28 sharpened edge of hoe head of one piece tool
30 machined out area for metal pipe to pass through head
32 nozzle

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Referring now to the drawings, in FIG. 1, the reference numeral 10 refers generally to the fire fighting tool of this invention. Tool 10 includes an elongated handle 12 which has a hollow interior and is formed of polyurethane, a durable, maintenance free, hand-fitted material enclosing the metal pipe 14. A hoe head part 16 formed of heat treated steel attaches the metal pipe 14 by a metal collar 18. The metal collar 18 is permanently connected to the metal pipe inwardly of a threaded end portion 26. Metal lock washer 20 and metal lock nut 22 secure the hoe head 16 to collar 18. A slot 17 in collar 18 receives an interlocking projection 31 which prevents rotation of the hoe head. Pipe thread 24 forms the rear end portion of metal pipe 14 and attaches to a garden hose or other standard metal pipe thread fittings not shown. Metal pipe thread 26 forms the forward end portion of metal pipe 14 for attachment of a nozzle 32. Sharpened end 28 is an extension of hoe head 16 and is used for cutting and scraping soil and to pierce the ground surrounding burning tree roots, grass roots and debris when thrust forcefully thereagainst to thereby expose burning embers in fire mop up operations. Fire mop up operations consist of mixing embers with mineral soil.

Tool 10 is designed to perform as a fire fighting tool by attaching a hose at the rear end thread fitting 24. Water runs through the entire tool and exits at the nozzle 32.

FIG. 2 shows top view of handle 12 indicating hollow metal pipe 14 running the entire length of handle 12. Metal collar 18 shows slot into which hoe head 16, shown in FIG. 1, inserts and locks into handle 12 to prevent hoe head rotation.

FIG. 3 shows machined hole 30 which allows metal pipe 14 shown in FIG. 2 to pass through hoe head 16.

FIG. 4 shows a front view of the hoe head 16 and machined hole 30 through which metal pipe 14, shown in FIG. 2, passes Sharpened edge 28 is an extension of hoe head 16.

FIG. 5 shows a top view of the hoe head 16 with the interlocking extension which inserts into collar 18 shown in FIG. 2.

The tool 10 weighs approximately 8 pounds, and is about three feet in length. Because of its light weight, it facilitates use by a single individual. A single fireman can accomplish mop up in fire situations with use of tool 10. Normally two firemen, one using a hoe and one manning a water source such as a hose or wand, are needed to accomplish this task. While two tools are normally needed, with the use of tool 10, only one tool is required.

From the above, it can be seen that I have provided an improved fire tool which readily enhances the fire fighting abilities of firemen and at the same time combines the use of two tools into one. Test runs have shown that this tool is highly effective in accomplishing the quick extinguishing of fire embers. Its use as a fire fighting hoe with water capabilities saves steps and time.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed:

1. A portable fire fighting tool for aiding in extinguishing a fire of burning embers beneath combustible ground cover such as tree roots, grass roots and debris comprising:

a) an elongated steel pipe having a first threaded end, a second threaded end and a hollow interior:

b) a metal collar permanently connected to said steel pipe inwardly of said first threaded end, said metal collar having a slot formed in its periphery;

c) a hoe head connected to said steel pipe by a lock nut and washer combination which are threadably received on said first threaded end to hold said hoe head between said lock nut and washer combination and said metal collar:

said hoe head having an interlocking projection received in said slot of said metal collar to prevent rotation and a sharpened edge to pierce the ground:

d) a polyurethane handle surrounding said steel pipe from said metal collar to said second threaded end:

e) a nozzle threadably received on said first threaded end to allow water to flow to said burning embers supplied through said hollow interior from a water source connected to said second threaded end, whereby said hoe head and nozzle are operable to mix burning debris, mineral soil and water to extinguish said fire.

* * * * *